(12) United States Patent
Higginbotham et al.

(10) Patent No.: US 6,578,361 B1
(45) Date of Patent: Jun. 17, 2003

(54) METHODS AND APPARATUS FOR DETERMINING ENGINE CAVITY LEAKAGE

(75) Inventors: Jarvis Gerard Higginbotham, Hamilton, OH (US); Robert David Perry, Pleasant Plain, OH (US)

(73) Assignee: General Electric Co., Schenectady, NY (US)

( * ) Notice: Subject to any disclaimer, the term of this patent is extended or adjusted under 35 U.S.C. 154(b) by 26 days.

(21) Appl. No.: 09/943,496

(22) Filed: Aug. 30, 2001

(51) Int. Cl.[7] ................................................. F02C 3/00
(52) U.S. Cl. ..................... 60/772; 60/39.094; 73/40.5 R
(58) Field of Search .................... 60/39.094, 772, 60/796, 798, 801, 803; 73/49.2, 40.5 R, 40; 137/884; 251/353; 244/129.1

(56) References Cited

U.S. PATENT DOCUMENTS

| | | | | |
|---|---|---|---|---|
| 2,814,931 A | * | 12/1957 | Johnson | 60/39.094 |
| 2,949,736 A | * | 8/1960 | Rubbra | 60/39.094 |
| 3,552,436 A | * | 1/1971 | Stewart | 137/883 |
| 3,556,444 A | * | 1/1971 | Gerhard | 60/39.094 |
| 3,722,624 A | * | 3/1973 | Buckland | 60/39.08 |
| 3,841,089 A | * | 10/1974 | Clark | 60/39.094 |
| 4,086,670 A | * | 5/1978 | Krause et al. | 138/89 |
| 4,163,366 A | | 8/1979 | Kent | |
| 4,972,700 A | * | 11/1990 | Le | 73/49.2 |
| 5,168,901 A | * | 12/1992 | Marks | 137/884 |
| 5,176,359 A | * | 1/1993 | Leveson et al. | 137/884 |
| 5,275,255 A | * | 1/1994 | Huntley et al. | 180/326 |
| 5,285,636 A | * | 2/1994 | Mayo et al. | 244/129.1 |
| 6,328,070 B2 | * | 12/2001 | Clayton et al. | 137/884 |

* cited by examiner

Primary Examiner—Ted Kim
(74) Attorney, Agent, or Firm—Nathan D. Herkamp; Armstrong Teasdale LLP; Robert B. Reeser, III

(57) ABSTRACT

An apparatus is coupled to a gas turbine engine that includes a plurality of engine cavity drains. The apparatus includes a manifold block and a lower seal plate. The manifold block includes a plurality of indicators, and is coupled to the gas turbine engine such that each indicator is in flow communication with a respective engine drain. The lower seal plate is coupled to the manifold block.

20 Claims, 4 Drawing Sheets

US 6,578,361 B1

METHODS AND APPARATUS FOR DETERMINING ENGINE CAVITY LEAKAGE

BACKGROUND OF THE INVENTION

This invention relates generally to gas turbine engines and, more particularly, to methods and apparatus for determining engine cavity leakage.

Gas turbine engines often include a plurality of internal cavities that are in flow communication with a plurality of engine systems. As a result, when fluid leakage occurs within such an engine system, leakage accumulates within a cavity. To facilitate removing the leakage from the engine, a plurality of gravity drain lines extend between the engine cavities and a drain mast positioned on a lower side of the engine. The drain mast includes a plurality of flow-through openings that extend through an engine cowl surrounding the engine to permit leakage to exit the engine cowl.

When leakage is noticed exiting a cowl drain opening, the cowl is opened and the engine is visually inspected. If a source of the leakage is not located, then leak detection tooling, including leak detection check bags, are installed in flow communication with the gravity drain lines. The cowl is closed, and the engine is then operated. After engine operation, the leak detection tooling is reexamined to determine a source and flow-rate of the leakage. Determining an engine cavity source and flow-rate of the leakage may be a time-consuming and tedious task. Furthermore, depending on the engine being maintained, more than one person may be required for opening and closing the engine cowl, and as a result, maintenance costs associated with determining and quantifying engine cavity drain leakage may be increased.

BRIEF DESCRIPTION OF THE INVENTION

In one aspect of the invention, an apparatus for a gas turbine engine is provided. The engine includes a plurality of engine cavity drains, and the apparatus includes a manifold block and a lower seal plate. The manifold block includes a plurality of indicators, and is coupled to the gas turbine engine such that each indicator is in flow communication with a respective engine drain. The lower seal plate is coupled to the manifold block.

In another aspect, a method for detecting fluid leakage from a gas turbine engine using a leak detection system is provided. The engine includes a cowl surrounding the engine and a plurality of engine drains. The cowl includes a drain opening. The leak detection system includes a lower seal plate and a manifold block that includes a plurality of indicators that extend at least partially through the manifold block. The method includes coupling the manifold block to an exterior surface of the cowl such that the manifold block indicators are in flow communication with a plurality of engine drains, coupling the lower seal plate to the manifold block, operating the engine, and determining engine cavity leakage.

In a further aspect, a gas turbine engine is provided. The engine includes a cowl and a leak detection system. The cowl extends around the engine, and includes an interior surface, an exterior surface, and a drain opening that extends therebetween. The engine includes a plurality of engine cavity drains in flow communication with the cowl drain opening. The leak detection system includes a manifold block and a lower seal plate. The manifold block is coupled to the cowl, and includes a plurality of indicators that extend at least partially through the manifold block and are in flow communication with the cowl drain opening and the engine cavity drains. The lower seal plate is coupled to the manifold block.

DETAILED DESCRIPTION OF THE INVENTION

Figure 1:
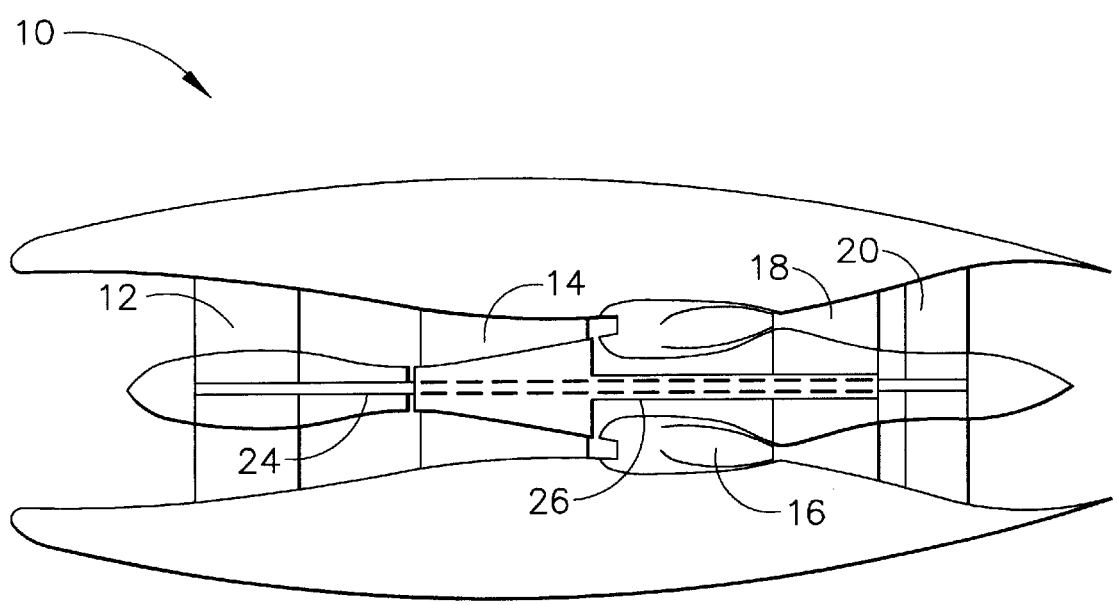
FIG. 1 is a schematic illustration of a gas turbine engine including a plurality of borescope inspection port openings.

FIG. 1 is a schematic illustration of a gas turbine engine 10 including a low pressure compressor 12, a high pressure compressor 14, and a combustor 16. In one embodiment, engine 10 is a GE90 engine commercially available from General Electric Company, Cincinnati, Ohio. Engine 10 also includes a high pressure turbine 18, a low pressure turbine 20, and a plurality of inspection port openings (not shown in FIG. 1). The inspection port openings, discussed in more detail below, provide access for inspection of turbines 18 and 20, compressors 12 and 14, and combustor 16. Compressor 12 and turbine 20 are coupled by a first shaft 24, and compressor 14 and turbine 18 are coupled by a second shaft 26.

Figure 2:
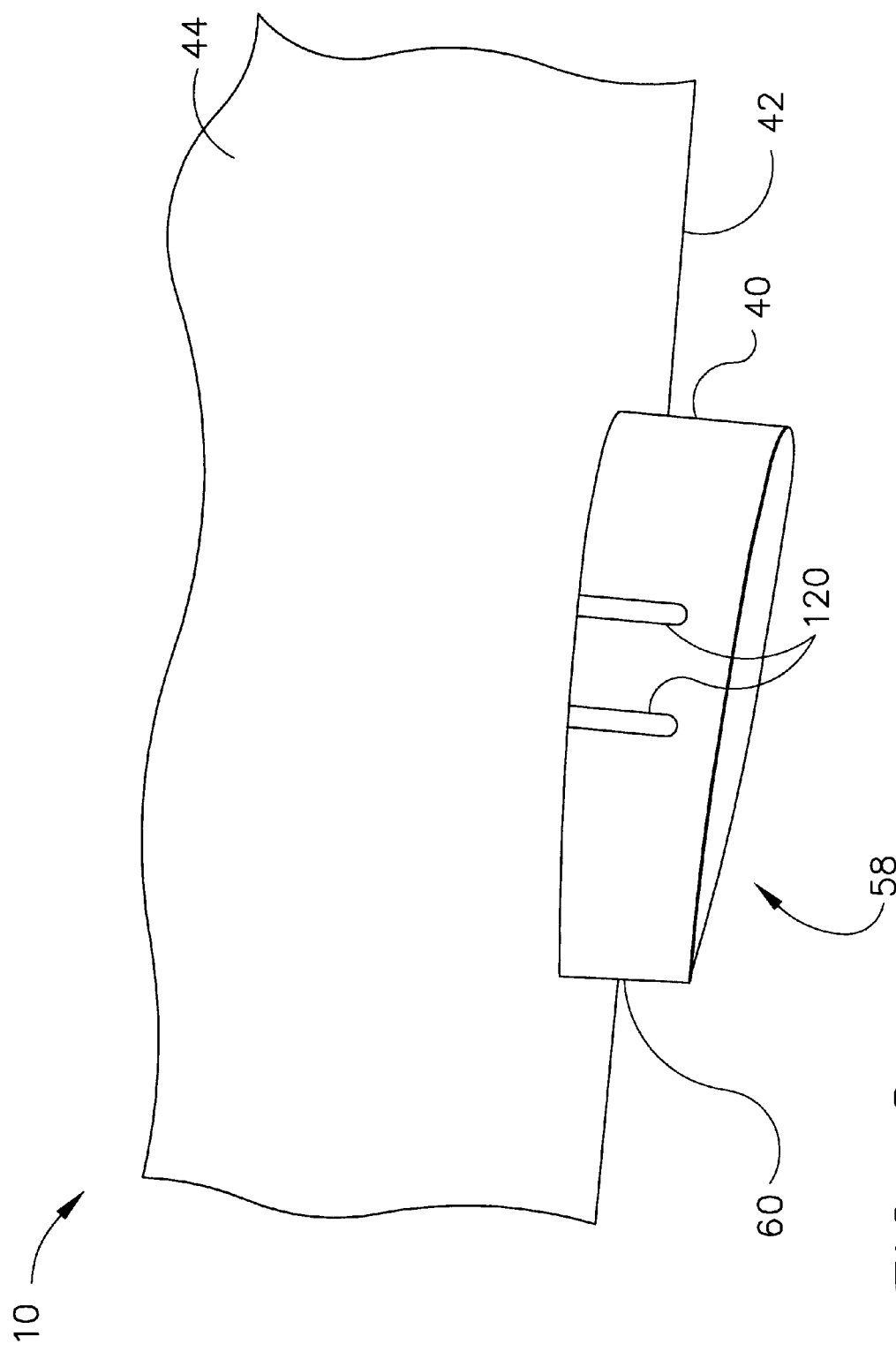
FIG. 2 is a perspective view of the gas turbine engine shown in FIG. 1 including a leak detection system and a closed cowl.
Figure 3:
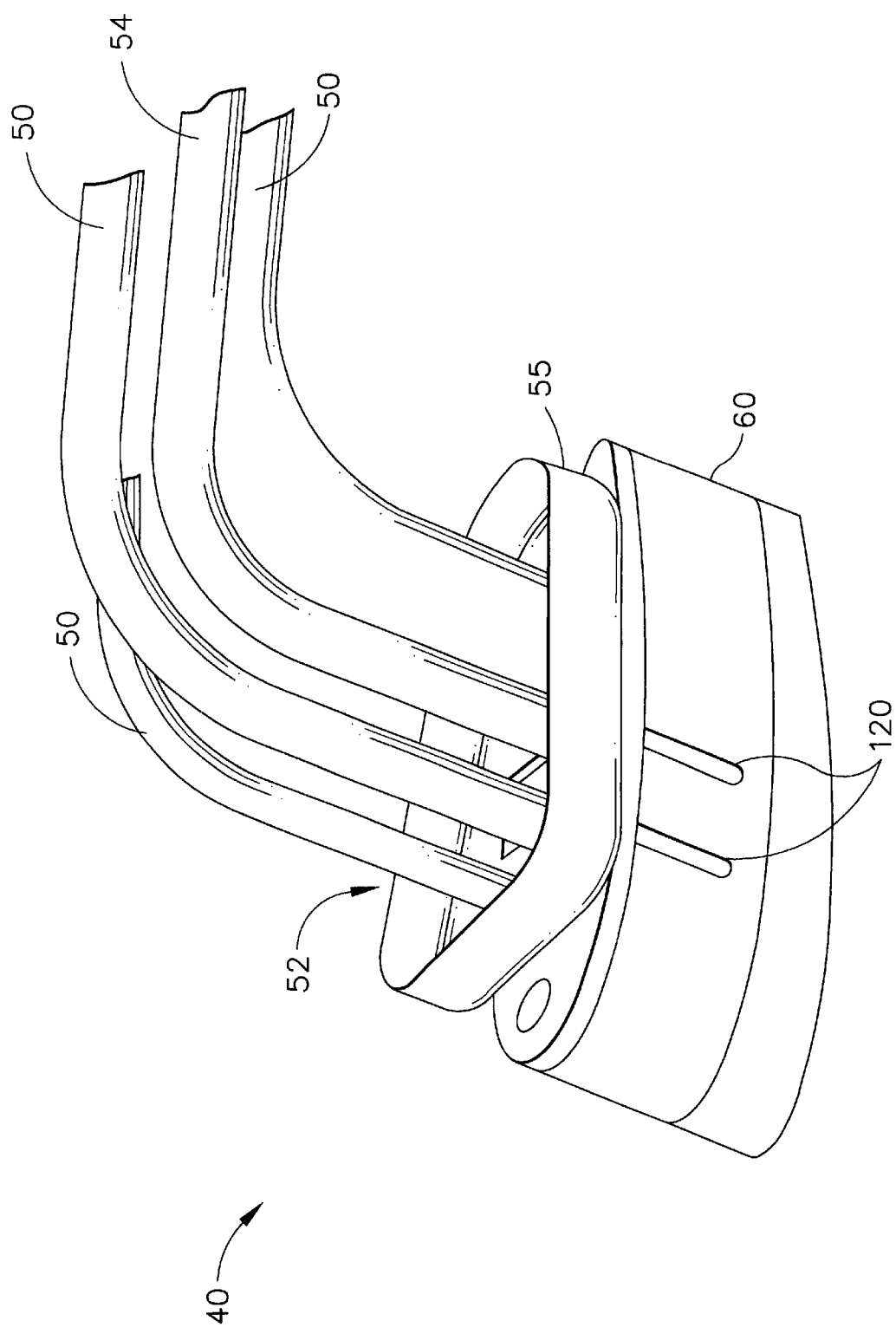
FIG. 3 is a perspective view of the leak detection system shown in FIG. 2 with the cowl removed.

FIG. 2 is a perspective view of gas turbine engine 10 including a leak detection system 40 and a cowl 42 in a closed position. FIG. 3 is a perspective view of leak detection system 40 with cowl 42 removed. Cowl 42 extends circumferentially around engine 10 and is selectively movable between an open and closed position to provide access to engine 10 and associated components, such as but not limited to low pressure compressor 12 (shown in FIG. 1), high pressure compressor 14 (shown in FIG. 1), and combustor 16 (shown in FIG. 1). In one embodiment, cowl 42 includes a pair of doors coupled in a clamshell-type configuration.

Cowl 42 includes an internal surface (not shown) and an external surface 44. A plurality of drain lines 50 are routed from gas turbine engine internal cavity drains (not shown) to a drain mast 52 of engine 10. An additional drain line 54 is routed from an air/oil separator cavity (not shown) to drain mast 52. Engine drain mast 52 includes an attachment flange 55 and a plurality of openings (not shown) extending therethrough. In the exemplary embodiment, engine 10 includes five drain lines 50 and one air/oil separator drain line 54 routed to a respective cowl drain opening. Drain mast 52 is at a lower side 58 of engine 10, known as a six o'clock position, which is closest to a gravitational field. Accordingly, lines 50 and 54 permit gravitational forces to drain leakage from the cavity drains through the cowl drain openings.

Leak detection system 40 includes an aerodynamically-shaped body 60 coupled to cowl exterior surface 44. More specifically, leak detection system 40 is coupled to cowl 42 such that leak detection system body 60 is in flow communication with engine drain mast 52. Accordingly, leak detection system 40 includes a plurality of openings (not shown in FIGS. 2 and 3) that extend through body 60 and are in flow communication with drain mast 52. More specifically, each leak detection body opening is in flow communication with a respective cowl cavity drain opening.

Additionally, leak detection body 60 includes a plurality of indicators (not shown in FIGS. 2 and 3) in flow communication with the drain mast 52. In the exemplary embodiment, the indicators are sight glasses. The indicators each have a pre-determined volume capacity and are positioned to visually indicate leakage from a cavity drain. The body openings are also in flow communication with the indicators and permit overflow leakage to drain through leak detection body 60 when leakage from a drain cavity exceeds the volume capacity of the respective indicator.

Figure 4:
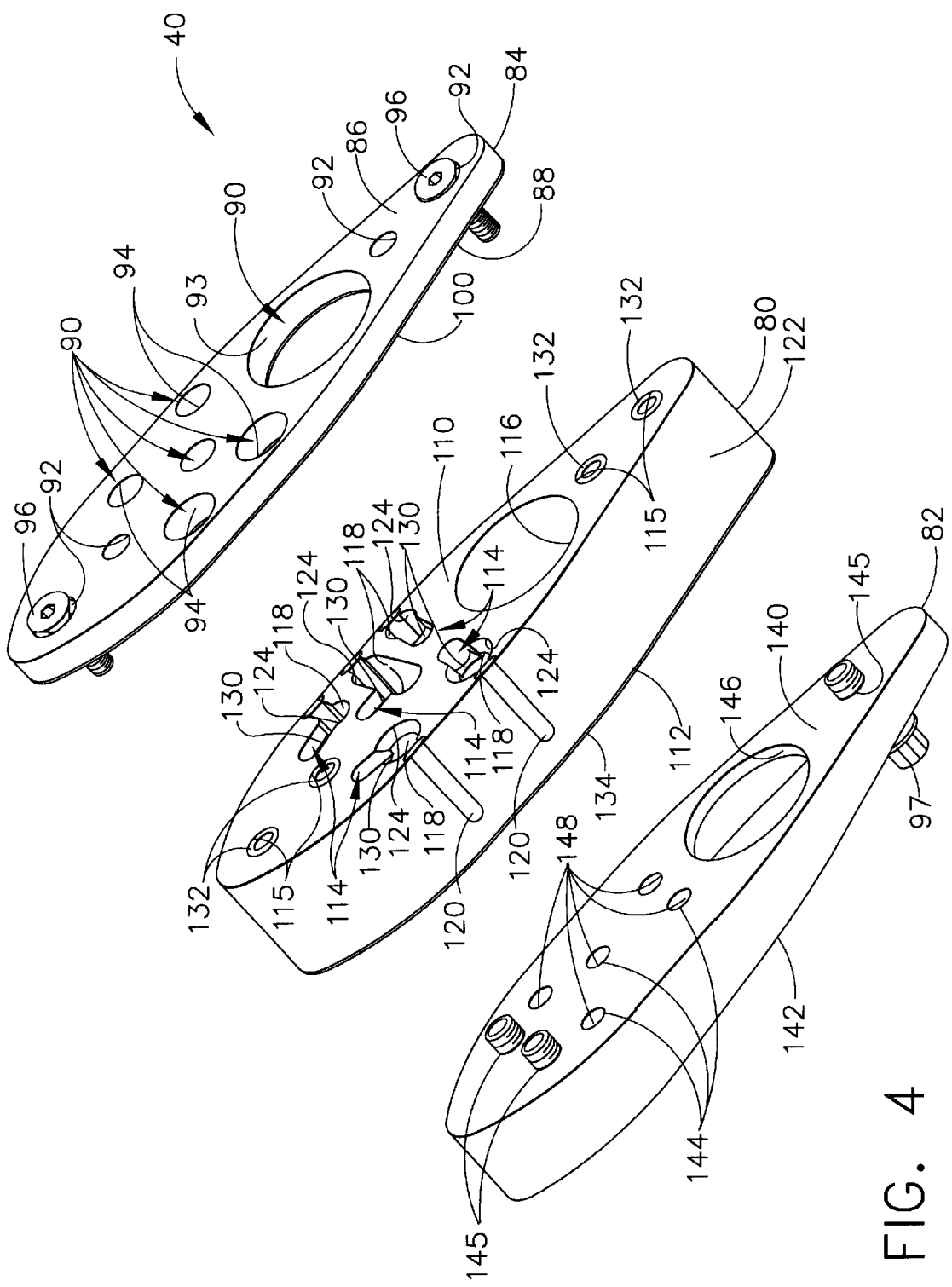
FIG. 4 is an exploded perspective view of the leak detection system shown in FIG. 2.

FIG. 4 is an exploded perspective view of leak detection system 40. Leak detection system body 60 includes a manifold block 80, a lower seal block 82, and an upper seal plate 84. In one embodiment, upper seal block 84 is formed integrally with drain mast 52 (shown in FIGS. 2 and 3). Upper seal block 84 is coupled to cowl 42 (shown in FIG. 2) and includes an inner surface 86, an outer surface 88, and a plurality of drain openings 90 and fastener openings 92 extending therebetween. More specifically, in the exemplary embodiment, upper seal block 84 includes an air/oil separator drain opening 93 for receiving leakage therethrough from air/oil separator drain line 52 (shown in FIG. 3), and five drain openings 94 for receiving leakage from respective cavity drain lines 50 (shown in FIG. 3).

Upper seal block fastener openings 92 are sized to receive fasteners 96 for securing manifold block 80 to upper seal block 84. A gasket 100 is adjacent upper seal block outer surface 88 between upper seal block 84 and manifold block 80. Gasket 100 ensures sealing contact is maintained between upper seal block 84 and manifold block 80.

Manifold block 80 is coupled to upper seal block 84 with fasteners 96 and includes an inner surface 110, an outer surface 112, and a plurality of drain openings 114 and fastener openings 115 extending therebetween. More specifically, in the exemplary embodiment, manifold block 80 includes an air/oil separator drain opening 116 for receiving leakage therethrough from air/oil separator drain line 52, and five drain openings 118 for receiving leakage from respective cavity drain lines 50. Manifold block air/oil separator drain opening 116 is concentrically aligned with respect to upper seal block air/oil separator drain opening 93.

Manifold block 80 also includes a plurality of indicators 120 extending from inner surface 110 towards outer surface 112. In the exemplary embodiment, each indicator 120 is a sight glass positioned adjacent a sidewall 122 of manifold block 80, such that indicators 120 provide visual identification of leakage from engine drain cavities. Sidewall 122 extends between inner and outer surfaces 110 and 112, respectively, of manifold block 80. Each indicator 120 has an entrance opening 124 within manifold block inner surface 110 that is concentrically aligned in flow communication with respect to each respective upper seal block drain opening 94.

Each indicator 120 extends inward from manifold block inner surface 110 towards manifold block outer surface 112 to define a volume capacity within manifold block 80. More specifically, indicators 120 are selected to have pre-determined volume capacities, such that an amount of leakage received within each indicator 120 is quantifiable. In one embodiment, each indicator 120 has a volume capacity approximately equal ten cubic centimeters.

Each manifold block drain opening 114 is coupled in flow communication with each respective indicator 120 with a flow channel 130. Drain openings 114 are known as overflow ports, and each flow channel 130 permits excess leakage to drain through manifold block 80 after the volume capacity of a respective indicator 120 has been exceeded. Additionally, drain openings 114 prevent a back-flow of leakage into engine sumps.

Each fastener opening 115 includes threaded insert 132 for receiving threaded fasteners 97. A gasket 134 is adjacent manifold block outer surface 112 between manifold block 80 and lower seal block 82. Gasket 134 ensures sealing contact is maintained between manifold block 80 and lower seal block 82.

Lower seal block 82 is coupled to manifold block 80 with fasteners 97 and includes an inner surface 140, an outer surface 142, and a plurality of drain openings 144 and fastener openings 145 extending therebetween. More specifically, in the exemplary embodiment, lower seal block 82 includes an air/oil separator drain opening 146 for receiving leakage therethrough from air/oil separator drain line 52, and five drain openings 148 for receiving leakage from respective cavity drain lines 50. Lower seal block air/oil separator drain opening 146 is concentrically aligned with respect to upper seal block air/oil separator drain opening 94.

Each lower seal block drain opening 148 is concentrically aligned with each respective manifold block drain opening 114, and as such, each lower seal block drain opening 148 permits excess leakage to drain from manifold block 80 through lower seal block 82 after the volume capacity of a respective manifold block indicator 120 has been exceeded.

During operation, leakage that has accumulated in the engine cavities is gravity drained through drain lines 50 and drain mast 52 into leak detection system 40. Specifically, leakage flows through respective upper seal plate drain openings 90 into manifold block indicators 120. Accordingly, indicators 120 provide visual confirmation of leakage without opening cowl 42. Furthermore, leakage exceeding the indicator volume capacity will flow through manifold block flow channels 130 into manifold block drain openings 114 and through lower seal block drain openings 148.

Accordingly, leakage is visually identified and a flow rate is quantified without opening cowl 42. When leakage is found in any of manifold block indicators 120, a mechanic notes which drain cavity is leaking, and drains the cavity drain system by removing lower seal plate 82 and manifold block 80, and emptying indicators 120. Leak detection system 40 is then reinstalled, and re-inspected after flight. Post-flight leakage level is then used to determine what follow-on engine maintenance is needed.

The above-described leak detection system is cost-effective and highly reliable. The leak detection system is a self-contained modular system that provides for leakage rate determination and a positive visual leakage detection without opening the cowl. Accordingly, additional leak detection tools, such as leak check bags, are not used with the leak detection system. As a result, the leak detection system facilitates detecting engine cavity leakage in a cost-effective and reliable manner.

While the invention has been described in terms of various specific embodiments, those skilled in the art will recognize that the invention can be practiced with modification within the spirit and scope of the claims.

What is claimed is:

1. A method for detecting fluid leakage from a gas turbine engine using a leak detection system, the engine including a centerline axis and a cowl surrounding the engine and including a drain opening, the engine including a plurality of engine drains, the leak detection system including a lower seal plate in communication with the drains and a manifold block including a plurality of indicators that extend at least partially through the manifold block, said method comprising the steps of:

coupling the manifold block to an exterior surface of the cowl such that the manifold block indicators are in flow communication with the engine drains;

coupling the lower seal plate radially outwardly from the manifold block such that the manifold block is coupled between the cowl exterior surface and the lower seal plate;

operating the engine; and determining engine cavity leakage.

2. A method in accordance with claim 1 wherein each manifold block indicator is a sight glass, said step of determining engine cavity leakage further comprises the step of visually examining the manifold block sight glass to determine engine cavity leakage.

3. A method in accordance with claim 2 wherein said step of coupling the lower seal plate further comprises attaching a gasket to the manifold block to provide sealing contact between the manifold block and the lower seal plate.

4. A method in accordance with claim 3 wherein the lower seal plate includes a plurality of openings extending therethrough, said step of coupling the lower seal plate further comprises the step of coupling the lower seal plate to the manifold block such that the lower seal plate openings are in flow communication with the manifold block indicators.

5. A method in accordance with claim 4 wherein said step of operating the engine further comprises the steps of:

capturing engine cavity leakage within manifold block indicators having a pre-determined volume capacity; and draining leakage through the lower seal plate openings after the manifold block indicators are filled to volume capacity.

6. Apparatus for a gas turbine engine including a plurality of engine cavity drains, the engine including a centerline axis, said apparatus comprising:

a manifold block comprising a plurality of indicators, said manifold block coupled to said gas turbine engine such that each said indicator in flow communication with a respective engine drain; and a lower seal plate in communication with the drains coupled radially outwardly from said manifold block, such that said manifold block is coupled between the engine centerline axis and said lower seal plate.

7. Apparatus in accordance with claim 6 wherein each said manifold block indicator comprises a sight glass configured to indicate leakage from a respective engine drain.

8. Apparatus in accordance with claim 6 wherein said manifold further comprises a plurality of openings extending therethrough, each said opening in flow communication with each said indicator.

9. Apparatus in accordance with claim 8 wherein each said opening comprising an overflow configured to drain excess fluid from each said respective indicator.

10. Apparatus in accordance with claim 6 wherein each said indicator has a pre-determined volume capacity.

11. Apparatus in accordance with claim 6 further comprising a gasket between said manifold block and said lower seal plate, said lower seal plate comprising a plurality of openings in flow communication with said manifold block plurality of indicators.

12. Apparatus in accordance with claim 6 wherein said manifold block configured to couple to an engine cowl surrounding the gas turbine engine, said plurality of manifold block indicators configured to indicate leakage from the gas turbine engine with a closed engine cowl.

13. A gas turbine engine including a centerline axis, said engine comprising:

a cowl extending around said engine, said cowl comprising an interior surface, an exterior surface, and a drain opening extending therebetween;

a plurality of engine cavity drains in flow communication with said cowl drain opening; and a leak detection system comprising a manifold block and a lower seal plate in communication with the drains, said manifold block coupled to said cowl, and comprising a plurality of indicators extending at least partially through said manifold block and in flow communication with said cowl drain opening and said engine cavity drains, said lower seal plate coupled radially outwardly from said manifold block, such that said manifold block is coupled between the engine centerline axis and said lower seal plate.

14. A gas turbine engine in accordance with claim 13 wherein each said leak detection system manifold indicator has a pre-determined volume capacity.

15. A gas turbine engine in accordance with claim 13 wherein said leak detection system manifold plurality of indicators comprise a plurality of sight glasses.

16. A gas turbine engine in accordance with claim 15 wherein said leak detection system manifold block comprises a plurality of first openings and at least one second opening, each said manifold block first opening in flow communication with a respective indicator.

17. A gas turbine engine in accordance with claim 16 wherein said leak detection system lower seal plate comprises a plurality of openings extending therethrough, said lower plate seal plate openings in flow communication with said manifold block first openings.

18. A gas turbine engine in accordance with claim 16 wherein each said leak detection system manifold block first opening comprises an overflow configured to drain excess fluid from each said respective indicator.

19. A gas turbine engine in accordance with claim 15 wherein said cowl selectively moveable to provide access to said engine, said plurality of manifold block indicators configured to indicate leakage from said gas turbine engine with a closed engine cowl.

20. A gas turbine engine in accordance with claim 15 wherein said leak detection system further comprises a gasket between said manifold block and said lower plate seal, said manifold block indicators configured to provide visual leakage detection.

* * * * *